Oct. 18, 1966  D. ARONSON  3,279,212
ABSORPTION REFRIGERATION CONTROL
Filed June 5, 1964  2 Sheets-Sheet 1

DAVID ARONSON
INVENTOR.

BY Daniel H. Bobis
Atty.

Oct. 18, 1966  D. ARONSON  3,279,212
ABSORPTION REFRIGERATION CONTROL
Filed June 5, 1964  2 Sheets-Sheet 2

DAVID ARONSON
INVENTOR.

BY Daniel H. Bobis
Atty

United States Patent Office 3,279,212
Patented Oct. 18, 1966

3,279,212
ABSORPTION REFRIGERATION CONTROL
David Aronson, Upper Montclair, N.J., assignor to Worthington Corporation, Harrison, N.J., a corporation of Delaware
Filed June 5, 1964, Ser. No. 372,773
10 Claims. (Cl. 62—476)

This invention relates to a control system for absorption refrigeration. It relates in particular to an improved control arrangement which avoids crystallization under low load conditions of the hydrophilic salt solution, or brine circulated in the system.

My copending application Ser. No. 227,368 filed on October 1, 1962, now Patent 3,154,930, granted November 3, 1964, illustrates an absorption system into which the present invention may be incorporated.

Absorption refrigeration systems of the type presently contemplated are well known in the art. This form of refrigerating means includes a closed system having an absorber, a generator, a condenser, an evaporator and a heat exchanger, interconnected to circulate an absorbent salt in solution with a refrigerant such as water.

In the presently shown arrangement absorber and evaporator elements are disposed within a first low pressure shell enclosure whereby water vapor may flow up into the absorber and be contacted by sprayed streams of the brine solution. Condenser and generator elements are positioned in a higher pressure second shell enclosure, and relatively disposed with respect to each other to pass vaporized refrigerant to the condenser.

In the generator, refrigerant vapor is boiled from weak brine solution for concentrating the latter. Vapor driven from the brine solution is thereafter condensed. Saturated condensate is then directed upwardly from the higher pressure shell, and into the low pressure shell evaporator in which at least a part of the condensate flashes. The concentration of brine passing between absorber and generator units may be controlled in any of several ways to regulate capacity of the system.

For example, as shown in my copending application Ser. No. 227,368, now Patent 3,154,930, means is provided for gravity feeding weak solution from the absorber to the generator for reconcentrating solution. The flow of weak solution to the generator is regulated as required to hold the concentration of absorbent in the solution to a value necessary to meet particular loading conditions.

Pressurized refrigerant introduced from the condenser into the lower pressure evaporator will at least partially flash under the low pressure and temperature conditions in the evaporator. Thus, a liquid or other fluid to be cooled passed through the evaporator section is subjected to the cooling atmosphere of the evaporator.

As a matter of economic practicality in operating an absorption system of the type herein described, capacity of the system must be adjusted in accordance with the load imposed thereon. Once such control means includes regulation of the flow of heating medium to the generator which, in effect, regulates the rate of vaporization of refrigerant from weak solution.

In my copending application, Ser. No. 338,488 filed on January 17, 1964, I disclose a novel absorption control means which permits continuous and accurate control of the system under all loading circumstances. In essence, the form of control described in the above noted copending application includes means for regulating the flow rate of weak solution passing from the absorber. This flow of weak solution is proportioned into several streams leaving the absorber. One stream is recirculated to the absorber and sprayed from headers at the upper portion thereof. A second stream is passed to the generator for reconcentration by vaporization of refrigerant from the solution. A third stream includes means regulating solution flow rate in another part of the circuit in effect to conform the rate of weak solution leaving the generator with the amount of cooling required at the evaporator.

A defect noted in the above system control, results in a decided propensity for solution to crystallize under low or no load conditions. This condition is particularly aggravated and promotes solution crystallization since control lines carrying weak solution from the absorber extend for at least a portion of the length thereof through the low temperature evaporator. Thus, the flow rate of solution passing from the absorber is reduced under a low loading condition. It has been found that under such conditions, the relatively narrow diameter pipes carrying solution from the absorber tend to become clogged as a result of crystallization, either frozen solid or in the form of slush which accumulates in the pipes.

The improvement provided in the instant invention includes means in absorber control conduits for heat exchanging between streams of weak solution leaving the absorber, either for regeneration, or to be recycled to the absorber. More specifically, the invention includes conduit means disposed in the low temperature evaporator shell to maintain weak solution passing therethrough at a temperature in excess of the crystallization temperature. Thus, according to one embodiment of the invention, a relatively constant flow of weak solution leaving the absorber is brought into heat exchanger contact with another similar, though variable solution flow also being carried from the absorber.

It is therefore, an object of the invention to provide a novel control means in an absorption system circulating line to overcome and prevent crystallization of weak solution in absorber-generator lines.

A further object of the invention is to provide an anti-crystallization arrangement of flow control conduits disposed in the system low temperature portion to maintain continuous flow therethrough regardless of ambient conditions.

A still further object of the invention is to provide an anti-crystallization, control arrangement in a lithium bromide absorption system including a plurality of conduits simultaneously carrying streams of absorbent solution from the absorber.

In the drawings—

FIG. 1 illustrates diagrammatically an absorption unit 10 of the type presently contemplated which includes the novel features embodying the instant invention. The apparatus includes elongated shell 11 forming a substantially vapor tight enclosure adapted to maintain a pressure less than atmospheric therein.

Figure 1:
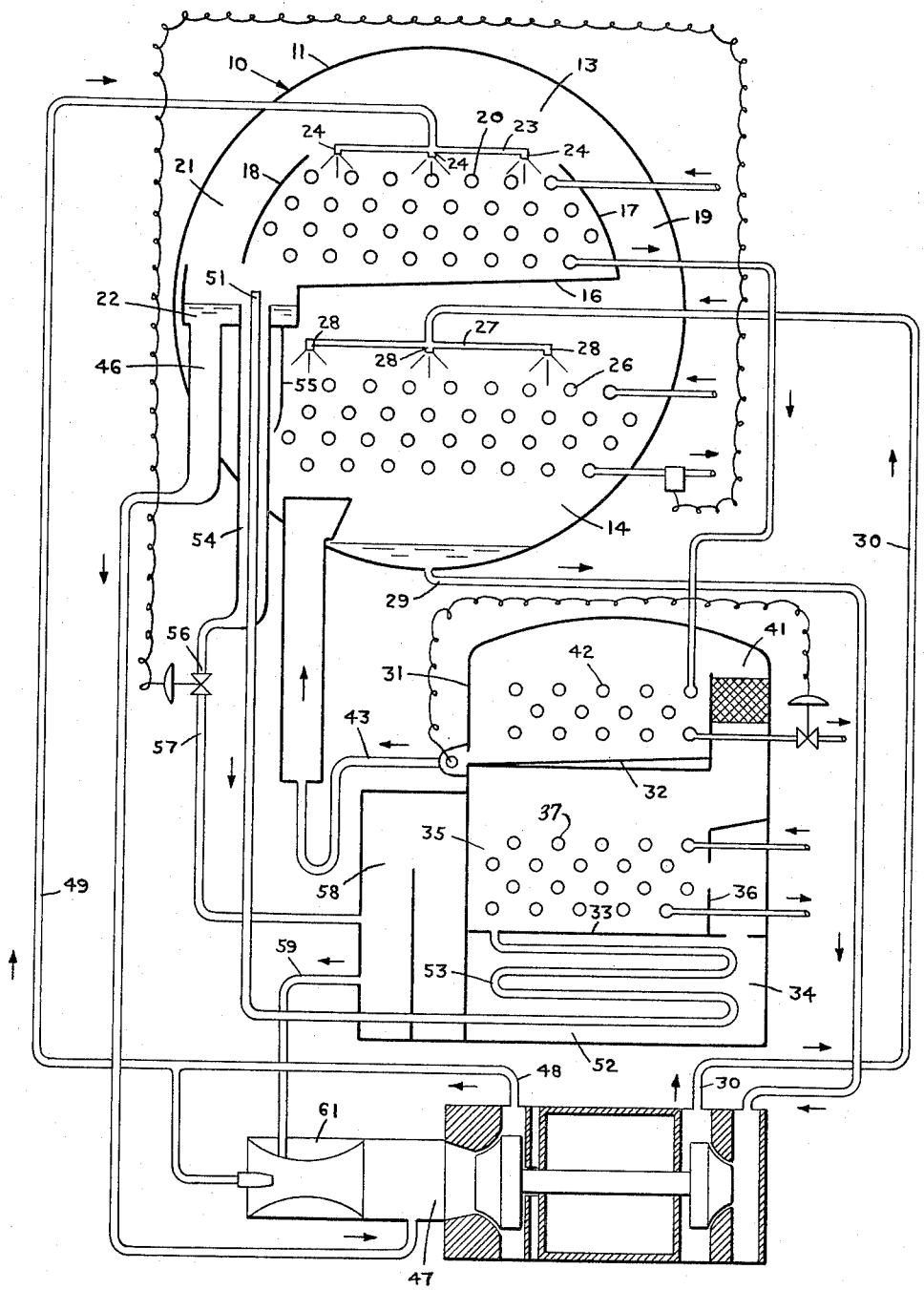
FIG. 1 is a semi-schematic arrangement of an absorption system of the type contemplated embodying the novel anti-crystallization feature.

Shell 11 may be of the unitary type and preferably horizontally disposed, with suitable openings built therein, to provide access to inner members.

Shell 11 includes an upper chamber 13 and a lower chamber 14. A partition 16 is disposed approximately centrally of the shell and extends longitudinally thereof having upstanding edges 17 and 18 positioned adjacent the shell inner walls, defining passages 19 and 21 therebetween. Panel 16 includes at one side, a sump 22 into which solution accumulated in panel 16 will tend to drain.

The upper absorber portion of shell 11 is defined by a coil 20 which includes an elongated tube bundle extending longitudinally of the shell 11, immediately above panel 16. Coil or tube bundle 20 includes appropriate inlet and outlet means for connection to a source of circulating water.

Spray header 23 is positioned in the upper part of the absorber section 13 and includes a plurality of downwardly directed nozzles 24 positioned longitudinally of the shell to direct sprayed solution into the absorber section and maintain surfaces of tube bundle 20 wetted at all times.

The lower chamber 14 of shell 11 includes a second tube bundle 26 connected to a source of fluid such as water or other liquid to be subjected to the cooling atmosphere of evaporator chamber 14. A spray header 27 in the lower portion of shell 11 adjacent panel 16, includes a plurality of nozzles 28 so disposed to wet surfaces of tube bundle 26 with refrigerant. Refrigerant then passes from the bottom of shell 11 into conduit 29 connected to the suction side of the pump 30 which discharges refrigerant through return line 30 to spray header 27.

A second shell 31 disposed to the lower side of, and in supporting relationship to shell 11, includes a first, horizontally extending panel 32 defining the system condenser in the shell upper part, with the generator 35 in the lower section. A second horizontally disposed panel 33 space downward from panel 32, defines heat exchanger 34 and generator 35. The generator of the system includes upstanding panel 36 holding a pool of solution in contact with heating coil 37. The latter may be communicated with a source of heating fluid, such as hot water, steam, or other medium. The flow rate of said medium to the generator may be regulated by suitable means to vary the rate at which refrigerant is vaporized from solution contained within the generator. Thus, under normal solution regenerating conditions, the generator and the system condenser function at a pressure of approximately 2.5 in. of mercury.

Vaporized refrigerant passing upward from the generator through passage 41, contacts condensing coil 42 and accumulates as condensate before being passed through conduit 43 for introduction to the lower pressure evaporator in shell 11.

One embodiment of control arrangement operable to regulate capacity of the disclosed absorption arrangement, includes a plurality of conduits disposed generally in evaporator section 14 and communicate with the sump 22 holding weak brine solution.

Referring to FIGURE 1 said plurality of conduits include a first pipe 46 having an inlet disposed in and connected to the lower surface of the sump 22. Pipe 46 is connected at its other end to the suction of pump 47. Thus, under normal conditions, weak solution contained in absorber sump 22 passed under a gravity head to the suction of pump 47. Thereafter, solution is recirculated through conduit 48 to upriser line 49, and thence introduced to spray header 23 in the absorber.

A second control conduit 51 also communicates with absorber sump 22 and is disposed with the inlet thereof at a height substantially above the inlet of conduit 46. Thus, conduit 51 will receive a variable flow stream of solution in accordance with the height of the solution above the inlet opening of conduit 51.

At very low load conditions, the rate of weak solution flow through conduit 51 is substantially decreased or even completely discontinued. Conduit 51 is communicated at its lower end to the coil side of heat exchanger 52 holding a coil 53 which is communicated with the generator 35 for passing preheated weak solution to the latter.

A third conduit 54 is disposed in substantial concentric relationship with conduit 51, surrounding and enclosing at least a portion thereof to completely insulate the latter from the evaporator.

A splash shield 55 is so placed with respect to conduits 46, 51 and 54 as to prevent direct impact of refrigerant sprays from nozzles 28. Any significant amount of liquid spray hitting these conduits will cause evaporation of the refrigerant and a consequent loss in capacity of the machine equivalent to the amount of refrigerant so evaporated. Accordingly, it is operationally important to reduce as much as possible the likelihood of liquid refrigerant coming in contact with conduits 46, 51 and 54.

Nevertheless, some liquid spray may reach the conduits to produce a small amount of cooling. Further, cooling can also take place as a result of radiation, convection and conduction. Even though the aggregate of these various modes of cooling is small, the total can still lead to a crystallizing condition if flow is obviated in one of the conduits, since with no flow the liquid will ultimately attain the temperature of the evaporator 14.

Conduit 54 as shown is so positioned with the inlet thereof below the inlet of conduit 51 that liquid will flow from absorber sump 22, even though the level is below the opening into conduit 51. The hydraulic principles governing the system are such that the total of liquid flows through conduit 51 and conduit 54 remain essentially constant during the time the equipment functions.

Conduit 54 includes a flow control valve 56 connected to conduit 57, which in turn communicates with chamber 58 receiving concentrated solution from the heat exchanger 35.

Conduit 57 is so connected to chamber 58 to direct weak solution directly from the absorber for mixing with hot concentrated solution leaving the generator 35 and heat exchanger 52. Thereafter, intermixed solution passes from chamber 58, through conduit 59, and to the inlet side of flow mixer 61, which is connected in turn to the suction of pump 47.

Valve 56 is adjustable to regulate the flow rate of weak solution passing to the chamber 58, in response to a condition within the absorption system, such as the temperature of liquid at evaporator coil 26 outlet. During periods of low load on the machine, the temperature at coil 26 outlet will tend to decrease, and by operation of a suitable control device not presently shown, valve 56 will be adjusted to a greater opening and pass a higher rate of solution flow therethrough.

The flow inducing capacity of flow mixer 61 is essentially constant. That is, flow through 61 is related to the proportions of its own flow passages and the flow characteristics of pump 47. Thus, increase in flow through conduit 57 due to the opening of valve 56 will reduce to an equal amount the flow out of chamber 58.

The net transfer rate of fluid passing between generator 35 and absorber 13 is determined by the rate of flow out of chamber 58. When the solution flow rate from chamber 58 increases, there will be an increase in the rate of transfer from generator 35 such that the level of solution in sump 22 of absorber 13 rises. As this level rises the rate of flow into pipe 51 will increase in accordance with known principles of flow over weirs or into pipes. Conversely, as the rate of flow out of chamber 58 decreases there will result a decrease in the rate of transfer from generator 35 such that the level of solution in sump 22 of absorber 13 decreases. As liquid level in the sump decreases, the rate of flow into pipe 51 will likewise decrease. When the rate of flow out of chamber 58 ceases entirely, the level of solution in sump 22 will fall below the level of the inlet into pipe 51 and flow from absorber 13 to generator 35 through pipe 51 will end. This will occur at low load or no load conditions.

It is readily seen by the position of conduits 51 and 54 with respect to the low temperature evaporator, that during such low load condition weak solution would tend to crystallize in conduit 51, and that during high load condition with zero flow in conduit 54, weak solution would tend to crystallize in conduit 54.

However, in accordance with the presently shown arrangement wherein said conduits are disposed contiguously one with the other, or alternately are disposed concentrically one with the other, the combination will in one sense define a heat exchanger extending substantially the length of the pipe passing through the evaporator.

Thus, regardless of loading conditions on the absorption system, there will be a continuous flow of weak solution through either conduit 51 or 54, or through both conduits combined. Thus, the amount of cooling of liquid in the conduits due to the proximity of evaporator 14, will result in only a small change in temperature of the combined flow such that there will be no risk of crystallizing. By virtue of the contiguous or concentric arrangement of conduits 51 and 54, heat exchange taking place between the fluids in the two conduits will serve to maintain both liquid streams essentially at the same temperature regardless of the rate of flow of either stream. Hence the arrangement assures only a small change in temperature in the combined stream, inherently assures only a small change in temperature of the individual streams.

Figure 2:
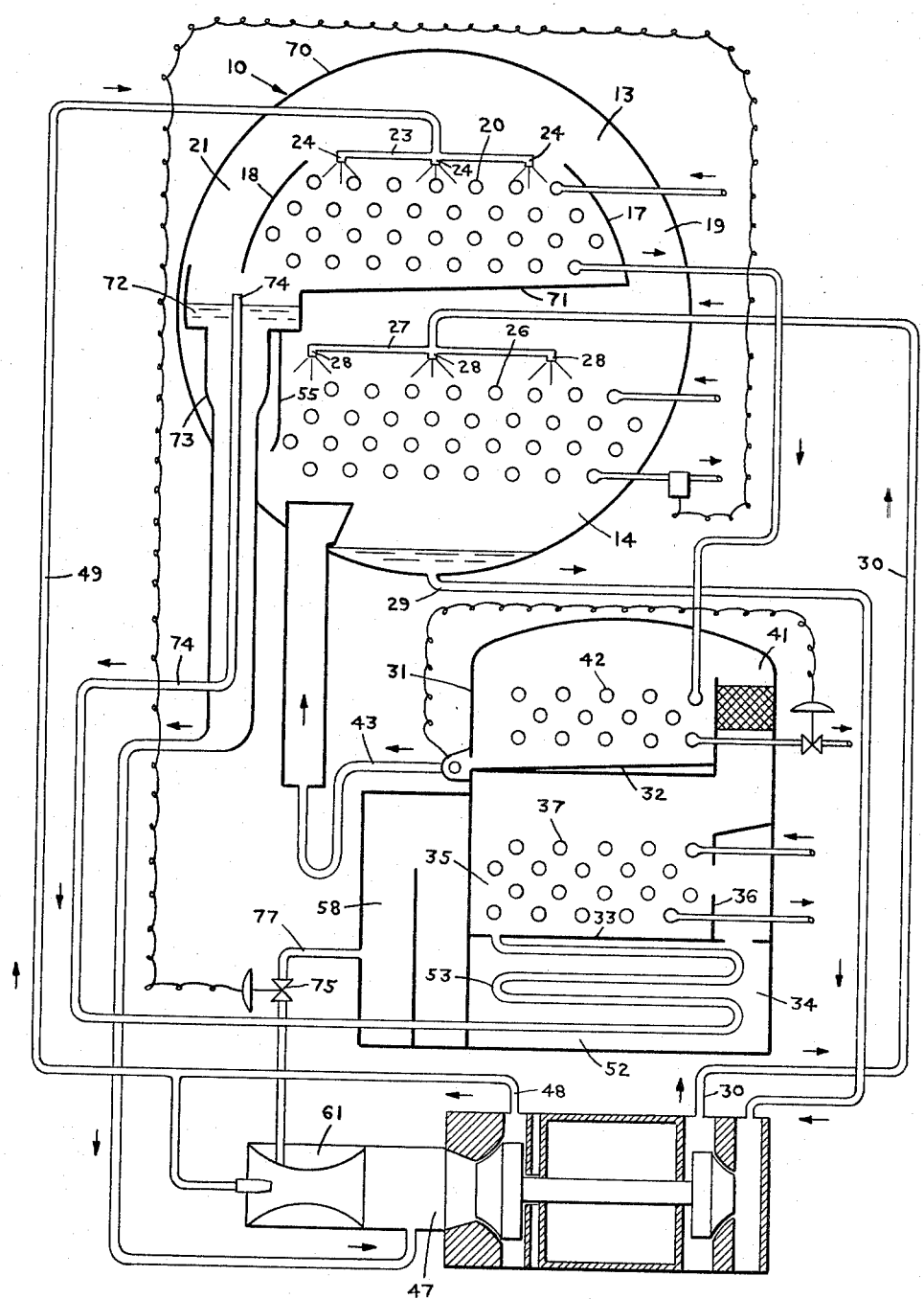
FIG. 2 is a view similar to FIG. 1 of an alternate embodiment of the anti-crystallization feature.

Referring to FIGURE 2, an alternate embodiment of the invention is shown in which the majority of elements, and the relationship therebetween are identical to the system shown in FIGURE 1. To simplify the description, identifying numbers in FIGURE 1 will be applied as well to the arrangement of FIGURE 2.

Shell 70 defines the enclosure about the absorber-evaporator portions of the apparatus. Panel 71 extending longitudinally of the shell forms separated absorber and evaporator portions. A sump 72 at one end of panel 71 accumulates weak solution which has passed through the absorber section.

First pipe 73 is communicated with the lower side of sump 72 and receives a substantially constant flow of weak solution. Conduit 73 is communicated with the suction of pump 47. Thus, weak solution passed through pump 47 by way of conduits 73 and 49 is recirculated from the lower part of the system and reintroduced into the absorber spray header 23 for spraying against absorber tube bundle 22. A second conduit 74 is disposed in communication with sump 72 and positioned substantially concentric with pipe 73. Conduit 74 is shown positioned with the inlet thereof above the inlet of conduit 73 such that with change in level of solution in sump 72, the rate of flow of weak solution into conduit 74 is substantially varied. Conduit 74 directs weak solution from sump 72 into the heat exchanger 34 and thence into the system generator 35 for reconcentration thereof and subsequent recirculation through the system so as to increase the concentration of solution being sprayed against absorber tube bundle 22.

This re-concentrated solution flows from generator 35 through the shell side of heat exchanger 34, and into chamber 58. Rate of mixed solution flow out of chamber 58 is controlled by valve 75 at the outlet of chamber 58 which is disposed in pipe 77 communicating with flow mixer 61. Valve 75 operates in response to conditions in the absorber system, as for example in response to the temperature of chilled water leaving evaporator coil 26, as described for the system of FIG. 1.

When at low or zero load, the temperature of the chilled water drops, a controller (not presently shown) functions to throttle valve 75 opening and so stop the flow out of chamber 58. Liquid then will not be returned from generator 35 to absorber 13, and solution will drain out of absorber 13 through conduit 74 until the level reaches that of the top of circut 74 and further drainage does not occur.

Solution will continue to flow out of conduit 74 until reaching a level determined by the pressure in generator 35 which is about 2 in. Hg higher than the pressure in absorber 13. This flow will result in the level in conduit 74 being about 20 inches higher than the level in generator 35.

If solution in conduit 51 were to be chilled by the cooling effect of evaporator 14, then the solution could crystallize and preclude subsequent flow at such time when the cooling load increases and the liquid level rises in sump 22 thereby causing solution to flow into conduit 74. Such low load crystallization would prevent flow through conduit 74 back to the generator 35 and adversely affect the performance of the absorption machine.

However, such crystallization is prevented as described above by virtue of the contiguous or concentric arrangement of conduits 73 and 74. The essentially constant flow of weak solution in conduit 73 maintains the temperature of fluid in both conduits 73 and 74, at a value fairly close to that of the solution entering sump 72 despite the cooling effect of the evaporator 14. In the concentric arrangement outer conduit 73 may be deemed a heat barrier to protect the solution in conduit 74 against the cooling effect of the evaporator.

It is readily seen that this embodiment of the invention although varying slightly in construction from the embodiment shown in FIG. 1, functions in substantially the same manner. Other similar control systems which function by virtue of a change in rate of flow of weak solution passing through the evaporator section are amenable to similar arrangement of conduits to avoid crystallization under conditions of low flow rate in any one or more conduits.

It is appreciated that the novel arrangement and connection of elements herein described with respect to the applicant's invention provides a preferred embodiment of the invention and is not meant to constitute a limitation thereon. It is further understood that certain changes and modifications may be made in the specific structure herein illustrated without departing from the spirit and scope of the invention.

What is claimed is:

1. A closed cycle absorption refrigeration system having a generator, a condenser, an absorber and an evaporator, and having a brine solution in varying concentrations circulated therein, comprising:
   (a) a shell housing the absorber and the evaporator,
   (b) a sump in the absorber for collecting liquid weak solution,
   (c) a plurality of conduit means extending through the evaporator and connected into the sump, to separately deliver the liquid weak solution from the sump to different parts of the system including at least a portion recycled to the absorber and a portion delivered to the generator, and
   (d) at least two of the conduit means disposed in heat exchange relation to each other to transfer heat from liquid weak solution flowing in the same direction in one of the conduit means to the other of said conduit means having low or no flow therein to avoid crystallization of the solution in the latter.

2. The combination claimed in claim 1 wherein:
   (a) one of the conduit means serving to continuously recycle the solution for redistribution in the absorber, and
   (b) the recycle conduit means disposed in heat exchange contact to transfer heat from the solution flowing therein to the other conduit means having an intermit flow responsive to the load on the system.

3. The combination claimed in claim 2 wherein:
   (a) a pump disposed in the recycle conduit means,
   (b) a flow mixer in communication with the pump and connected in the recycle conduit means,
   (c) a discharge conduit means connected between the generator and the flow mixer to deliver concentrated solution to the flow mixer, and
   (d) control means disposed in the discharge conduit means to regulate the flow of concentrated solution passing therefrom.

4. A closed cycle absorption refrigeration system having a generator, a condenser, an absorber and an evaporator, and having a brine solution in varying concentrations circulated therein, comprising:
   (a) a shell housing the absorber and the evaporator,
   (b) a sump in the absorber for collecting weak solution,
   (c) a plurality of conduit means extending through the evaporator and connected into the sump, to separately deliver weak solution to different parts of the system including a portion recycled to the absorber, a portion delivered to the generator, and a portion for spoilage, the amount of each dependent upon the load on the system, and (d) at least two of the conduit means disposed in heat exchange relation to each other to interchangeably transfer heat from the weak solution flowing in one of the conduit means to avoid crystallization of the solution in the other of said conduit means during periods of low or no flow in the latter.

5. The combination claimed in claim 4 wherein:
(a) one of said conduit means being disposed within the other of said conduit means for at least that portion of each which extends through the evaporator,
(b) one or the other of said conduit means having a flow of weak solution therethrough at all times during normal operation of said system to transfer heat from the weak solution to the conduit means having low or no flow therein to prevent crystallization in the latter, and
(c) each of the said conduit means to have the flow of weak solution therein responsive to the load on the system.

6. The combination claimed in claim 5 wherein:
(a) control means disposed in one or the other of said conduit means to regulate the flow therethrough responsive to the load on the system.

7. A closed cycle absorption refrigeration system having a generator, a condenser, an absorber and an evaporator, and having a brine solution in varying concentrations circulated therein, comprising:
(a) a low pressure shell,
(b) a partition disposed in the shell to form the absorber in the upper section thereof and the evaporator in the lower section thereof,
(c) a sump formed in the partition to collect the liquid weak solution from the absorber,
(d) a plurality of conduit means connected to the sump to deliver a substantially constant combined flow of liquid weak solution from the sump to said system,
(e) one of said conduit means disposed concentric to and of a larger diameter than another of said conduit means, and
(f) the pair of concentric conduit means extending from the sump at least through the evaporator wherein the flow of weak solution therein leaving the sump in one or the other of said conduit means to interchangeably transfer heat from said weak solution flowing in either of said conduit means to the other of said conduit means having low or no flow to prevent crystallization in the latter.

8. The combination claimed in claim 7 wherein:
(a) control means disposed in the concentric conduit means having the larger diameter to regulate the flow of weak solution therethrough.

9. The combination claimed in claim 8 wherein:
(a) the outer of the concentric conduit means extending into the sump a predetermined distance from the sump bottom,
(b) the inner of the concentric conduit means extending a greater height into the sump than said outer conduit means, and
(c) the concentric conduit means carrying a variable flow rate of solution responsive to the level of solution in the sump.

10. The combination claimed in claim 9 wherein:
(a) the outer of the concentric conduit means to define a thermo barrier about the inner of the concentric conduit means during periods of flow of weak solution therein.

References Cited by the Examiner
UNITED STATES PATENTS

| | | | |
|---|---|---|---|
| 2,284,691 | 6/1942 | Strandberg | 62—489 X |
| 2,365,797 | 12/1944 | Bichowsky | 62—494 X |

LLOYD L. KING, *Primary Examiner.*